United States Patent [19]
Jane Cabagnero

[11] Patent Number: 5,562,330
[45] Date of Patent: Oct. 8, 1996

[54] FOLDABLE BABY CARRIAGE FRAME AND CRADLE SEAT COUPLABLE TO SAME

[75] Inventor: Ramon Jane Cabagnero, Barcelona, Spain

[73] Assignee: Jane, S.A., Barcelona, Spain

[21] Appl. No.: 480,293

[22] Filed: Jun. 7, 1995

Related U.S. Application Data

[62] Division of Ser. No. 47,438, Apr. 16, 1993, Pat. No. 5,472,224.

[30] Foreign Application Priority Data

| Apr. 4, 1992 | [ES] | Spain | 9200976 |
| Sep. 21, 1992 | [ES] | Spain | 9201882 |
| Feb. 18, 1993 | [ES] | Spain | 9300488 |

[51] Int. Cl.$^6$ .................. A47C 4/00; A47D 1/02
[52] U.S. Cl. .................. 297/42; 297/44; 280/644; 280/649
[58] Field of Search ................ 297/44, 42, 45, 297/256.1; 280/642, 644, 649

[56] References Cited

U.S. PATENT DOCUMENTS

| 2,810,429 | 10/1957 | Lane et al. | 297/44 |
| 3,784,252 | 1/1974 | Peterson | 280/649 |
| 3,836,164 | 9/1974 | Sugino et al. | |
| 4,173,355 | 11/1979 | Prego | 280/642 |
| 4,216,974 | 8/1980 | Kassai . | |
| 4,324,410 | 4/1982 | Perego . | |
| 4,345,777 | 8/1982 | Perego | 297/45 |
| 4,353,577 | 10/1982 | Giordani | 280/642 |
| 4,428,598 | 1/1984 | Kassai . | |
| 4,640,519 | 2/1987 | Bigo . | |
| 4,765,645 | 8/1988 | Shamie . | |

FOREIGN PATENT DOCUMENTS

| 0483042 | 6/1991 | European Pat. Off. . | |
| 002663 | 10/1990 | Spain . | |
| 2169793 | 1/1985 | United Kingdom . | |
| 2167119 | 11/1985 | United Kingdom . | |
| 8502154 | 5/1985 | WIPO | 280/644 |

Primary Examiner—Peter M. Cuomo
Assistant Examiner—Anthony D. Barfield
Attorney, Agent, or Firm—Cushman Darby & Cushman, L.L.P.

[57] ABSTRACT

A collapsible baby carriage includes a foldable frame including a cradle seat defined by a pair of seat support arms each having one end pivotally connected to a lower end of a guide bracket with a guide bracket having an upper end connected to a pivot member allowing the front legs of the carriage to be folded intermediate their ends a pair of vertical arms are provided each having one end connected to a respective leg of a second pair of legs and an opposite end connected to a leg of the first pair between said pivot member and a second end of a leg of the first pair; the frame includes a pair of rods each having one end rotatably connected to one of the vertical arms intermediate the ends thereof on one side of the frame and a second end pivotally connected to a respective one of the seat support arms intermediate the ends thereof.

9 Claims, 8 Drawing Sheets

FOLDABLE BABY CARRIAGE FRAME AND CRADLE SEAT COUPLABLE TO SAME

This is a Divisional Application of Ser. No. 08/047,438, filed Apr. 16, 1993 now U.S. Pat. No. 5,472,224.

BACKGROUND OF THE INVENTION

1. Field of the Invention

This invention is a foldable frame, and cradle seat couplable to same, for baby carriages.

2. Related Art

The applicant is title holder of the Invention Patent ES P9002663, refering to a baby carriage frame made up of an inverted U handlebar slide mounted on the front feet by a guide flange, and to which the upper end of the corresponding rear foot is hinged. To the upper ends of the front feet, which are joined together by a cross member, are hinged the section ends of the transversal U element, which at the lower end of its vertical sections is hinged to the intermediate zone of the rear feet, being hinged in the rear to the upper zone of the sections of the mentioned U element, stringers for supporting the seat and/or cradle type carrier. Securing elements have been placed at the upper end of the front feet.

SUMMARY OF THE INVENTION

The purpose of this invention is to improve the frame of the baby carriage indicated in the Spanish Patent, to allow it to be folded not only from top to bottom, but also transversely, that is, moving the sides together to notably reduce its volume, with the added advantage of providing the baby carriage with another securing element which prevents accidental folding should the securing elements on the front feet fail, or be positioned defectively.

It is a characteristic feature of this new frame that all the transverse elements are hinged to allow the described folding operation of the frame.

Thus, the U section transverse element has been deprived of the transverse section, which has been replaced by two cross-hinged arms, which join the lower ends of the remaining vertical parts of the U section to the lower end of the handlebar sections, hinging the rear sections of said arms by means of tie-bars to the middle sections of the mentioned vertical elements.

Also, the middle section of the handlebar and the cross element joining the front feet together are split into hinged parts, the middle section of the handlebar being made up of two L-shaped elements, which are joined together by inserting and partially turning coaxially the corresponding sections of the handlebar, while the other sections are hinged together by a central transverse rod parallel to the handlebar sections, the hinge of which includes a securing pin which locks it in the unfolded position.

The hinged parts that make up the cross element between the front feet will, advantageously, be elastically impelled to its extended position.

Another characteristic is the presence of an eccentric locating pin which by partially turning its circular control device determines the linear displacement of the locking element, which ensures the coupling of the seat or cradle carrier to the stringers provided for this purpose on the frame, and which are hinged at the back to the above mentioned vertical elements.

Different models of cradle seats are already known which are made up of a seat frame with lateral arm rests and front railing, with backrest and footrest hinged to the frame. It is also known that these types of cradle seats are coupled removably to the frame of different models of baby carriages, being able to be positioned facing the front or rear.

In most of these carriages, above all in those in which the frame is folded transversally, the seat must be removed in order to fold the carriage as the framework of the former is transversally rigid, with the person pushing the baby in the carriage, usually mothers or baby sitters, have to perform various operations, usually cumbersome, when they have to fold the carriage, and they find themselves on one side of the folded carriage with the seat on the other, and, with the baby in it, cannot alone, for example, carry all the equipment onto public transport.

Another purpose of this invention is to obtain a cradle seat that folds together with the carriage, that is, a seat that does not require removal to fold the carriage. This eliminates the above mentioned problem, and also allows storing the carriage in a very small space, whether in the boot of a car or at home.

Another very important feature of this cradle seat is an automatic locking device which, when the seat is removed from the frame of the carriage, locks the transversal folding apparatus of the seat to prevent accidental holding and ensure the safety of the baby.

To obtain transversal folding of the cradle seat, the seat itself, backrest and footrest are flexible and mounted on frames, which include lateral supports, joined together by hinged elements.

These hinged elements, in the case of the seat are made up of two cross-hinged arms, which also include a locking caliperswhich, subject to elastic pressures, ensures the locking of the arms in their open position, and the use of the seat out of the carriage.

When the seat is coupled to the corresponding side stringers of the carriage frame, the operation of the above mentioned automatic locking device is cancelled as a crosswise hinged and divided rod hinged transversally to one of the longitudinal supports of the seat frame, and which protrudes at one end through the corresponding side armrest, makes contact with said end with the frame stringer and turns in such a way that the other end of the rod unlocks the above mentioned caliper, thereby allowing the crossed arms to fold when the cradle seat receives the transversal folding pressure exerted when the frame is folded.

When this type of baby carriage has to be folded, it presents some difficulties for the person who is looking after the baby, as the three locking pins must be manipulated, the handlebar locking pin and those on each side of the frame, and usually only one hand is available to do this as the other must be used to hold the baby.

To simplify this baby carriage pin unlocking operation a device has been conceived by which a single operation on the handlebar locking pin unlocks this pin as well as the two lateral locking pins.

In order that the baby carriage does not become insecure in its open position when the direct unlocking controls of the lateral locking pins are suppressed, as per the intention, a safety device has been envisaged on the handlebar hinge that can be manually unlocked in the same unlocking operation of said locking pin.

The handlebar in this case is made up of two "L" sections, whose shorter arms are hinged together to form the middle section of the handlebar, while the longer arms make up the branch sections of the handlebar, with the particularity that said branch sections are made up of two sections which may be turned coaxially to each other, one of whose sections, joined to the shorter arm, has the projection on which the baby carriage folding locking pin is hooked on, which locking pin is mounted on the front feet of the baby carriage.

Another characteristic is that the hinge, envisaged on the handlebar, in the position corresponding to the extended handlebar position is retained by an elastically sprung safety device, and has a manual control which can release the indicated hinge.

With this system, on turning one of the two shorter arms of the middle section of the handlebar with reference to the other, the coaxial rotation of the branch sections of the handlebar joined to said shorter arms is achieved, and with this the release of the projections of said branches with respect to the locking pins mounted on the front feet, thereby allowing the sliding of the handlebar branch sections over these, to achieve complete folding of the baby carriage.

BRIEF DESCRIPTION OF THE DRAWINGS

These and other features will be understood more clearly from the detailed description which follows, together with eight sheets of drawings, which serve as a practical representation of the carriage, and are shown only as a non limiting example of the scope of the invention.

In the drawings.

Figure 1:
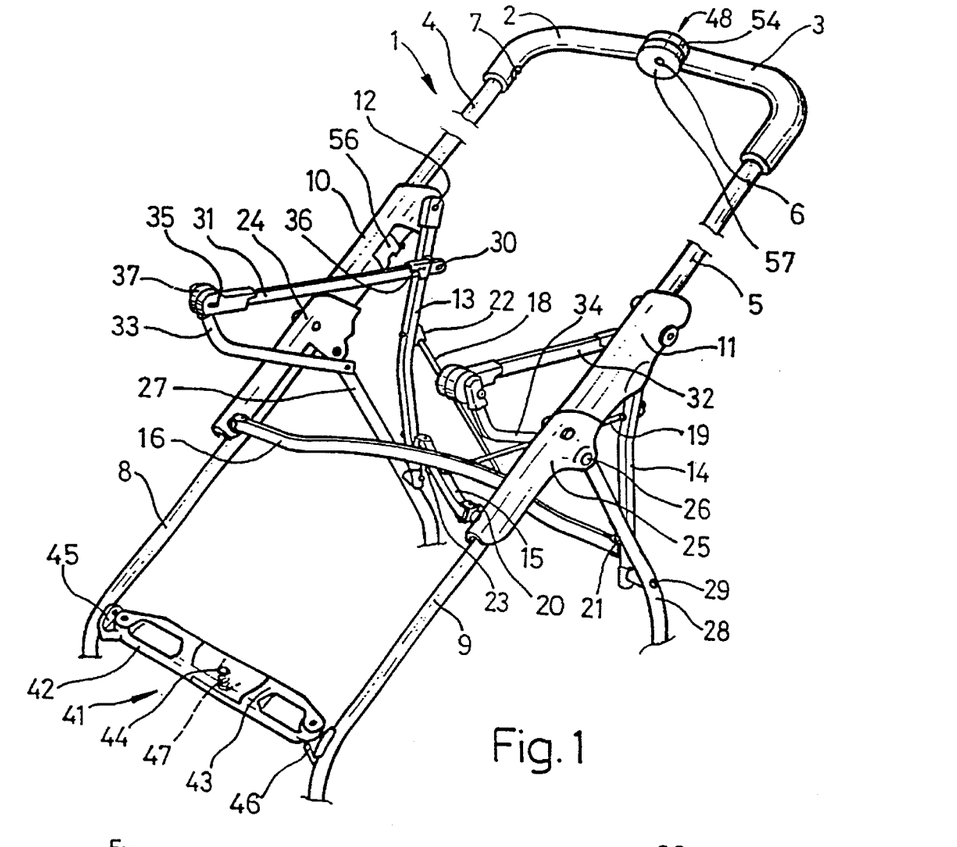
FIG. 1 shows a perspective of the frame assembly in the open position.

As shown in the drawings, the frame is made up of a handlebar 1, of general U shape, whose middle section, which forms the pushing handle, consists of two L-shaped sections 2 and 3, of which one section, shorter and tubular, is inserted, with capacity for partial coaxial turning, on the corresponding 4 and 5 sections of the handlebar, while the other sections of the L-shaped elements are hinged together by a transversal rod 6 parallel to the handlebar sections. Partial coaxial turning of the 2 and 3 L-shaped elements is achieved by the use of crosswise arranged slots 7 on same which are adjusted onto a fixed pivot on the 4 and 5 sections of the handlebar, and which are not shown in the drawings.

The handlebar 1 is slide mounted on the front feet 8 and 9 and is guided in movement by brackets 10 and 11 which are hinged with a pin 12 to the upper end of the vertical elements 13 and 14, which at their lower parts hinge the arm ends 15 and 16, which are cross-hinged at their centre 17 (FIG. 2), which at the other end are hinged with the lower ends of the 4 and 5 sections of the handlebar.

Figure 2:
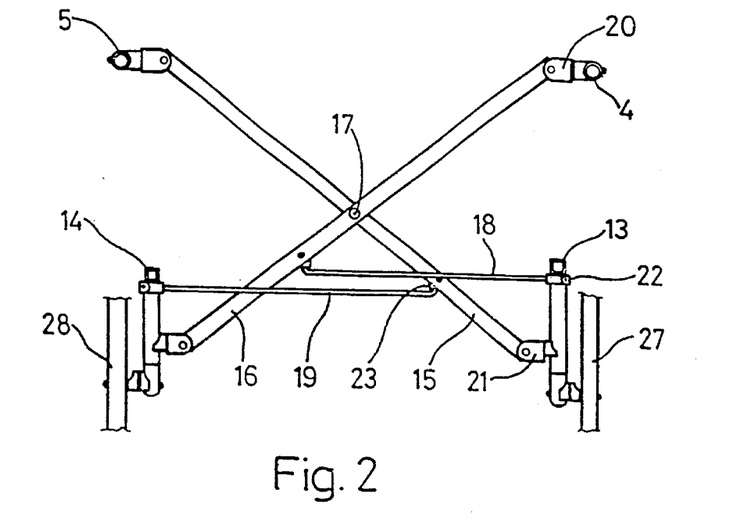
FIG. 2 is a schematic top view of the cross-hinged arms and the tie rods which allow the frame to be folded transversally.

The rear sections of said arms 15 and 16 are hinged by tie rods 18 and 19 to the middle sections of the vertical elements 13 and 14.

The end hinges 20 and 21 of the arms 15 and 16, as well as 22 and 23 of the tie rods 18 and 19 are double and are parallel to two axis arranged perpendicularly to each other.

The sections 4 and 5 of the handlebar, below the flanges 10 and 11, are joined to other guide brackets 24 and 25 through which slide the front feet 8 and 9, on whose guide flanges is hinged with a pin 26 the upper end of the rear feet 27 and 28, at the lower end of which are hinged by pins 29 the lower section of the vertical elements 13 and 14.

At the upper section of said vertical elements are hinged by a pin 30 the rear ends of the side stringers 31 and 32 which at their front end are hinge supported by their respective angular struts 33 and 34, which at their bottom end are hinged to the upper section of their respective rear feet 27 and 28.

Figure 6:
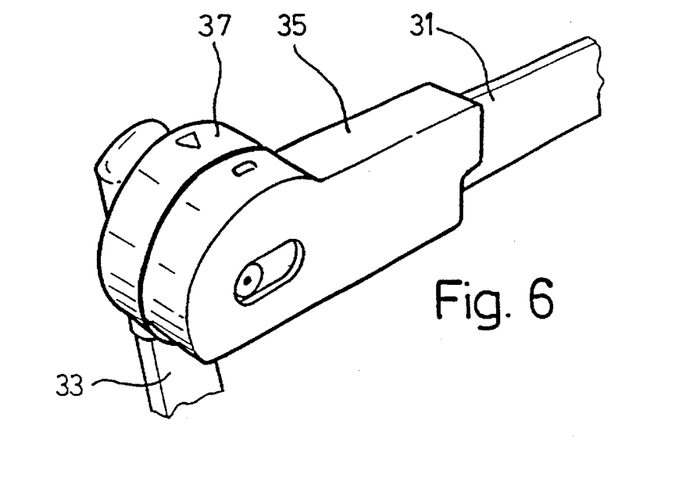
FIG. 6 shows a perspective of the eccentric locking pin which locks the seat and/or cradle carrier coupling.
Figure 7:
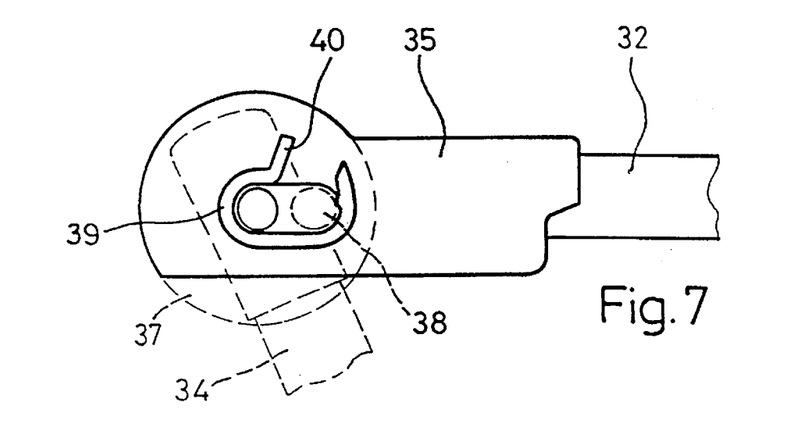
FIGS. 7 and 8 show, schematically, an elevation of the position of this locking device and the locking element in the locked and unlocked position, respectively.
Figure 8:
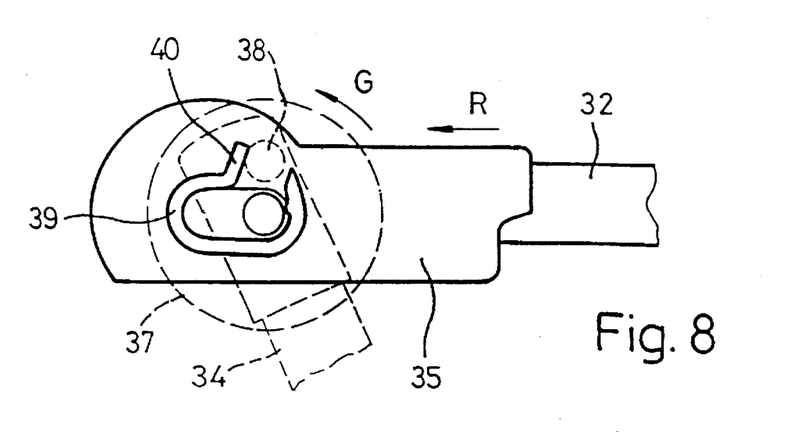

These stringers are provided with devices 35 and 36 which allow a seat to be moveably coupled on them. The front devices 35 are provided with a pin to ensure said coupling and consists of a circular control knob 37, which by partial rotation G and the intervention of an eccentric internal protrusion 38 determines the rectilinear displacement R of the locking device 35 and of which entails an internal-location 39 with a radial branch 40 upon which acts said eccentric projection (FIGS. 7 and 8).

Figure 5:
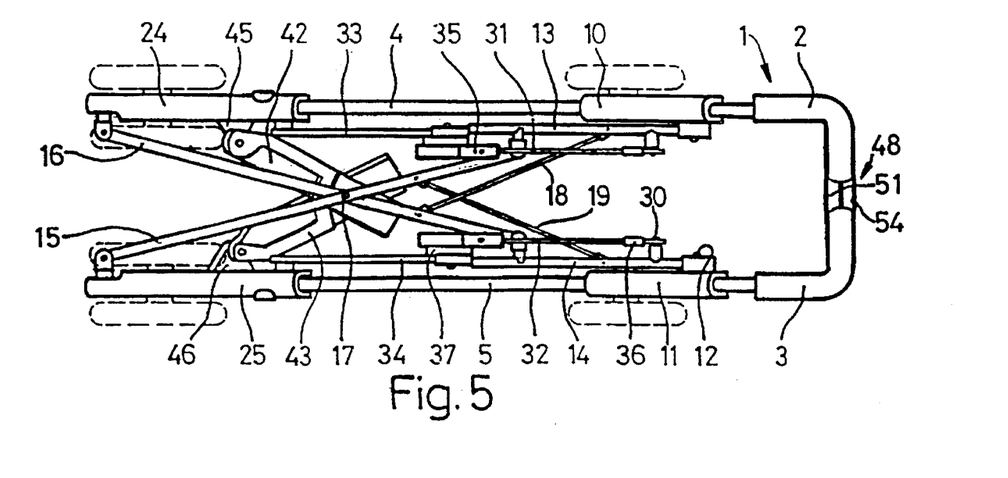
FIG 5 shows a top view of the folded frame.

The transversal folding of the chassis, bringing together the side elements, is assisted by the hinged arms 15 and 16, the tie rods 18 and 19, the hinges of the handlebar middle section 2–3 and the hinges of the cross-element 41 which joins the front feet 8 and 9 together.

This cross-element consists of two sections 42 and 43 hinged together by a pin 44 and hinged at their ends to their matching squares 45 and 46 fixed to the front feet, with a spiral spring 47 mounted on the central hinge 44 which pushes said sections to their extended position in which they locate in prolongation to each other.

Figure 3:
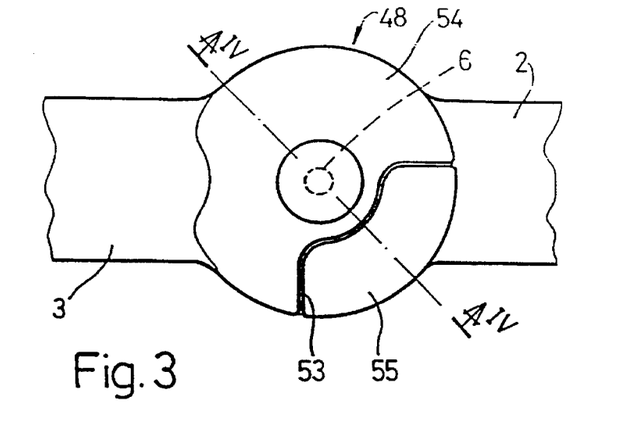
FIGS. 3 and 4 show a top view and sectional elevation, respectively, of the hinge and locking device of the two elements which make up the middle section of the handlebar.
Figure 4:
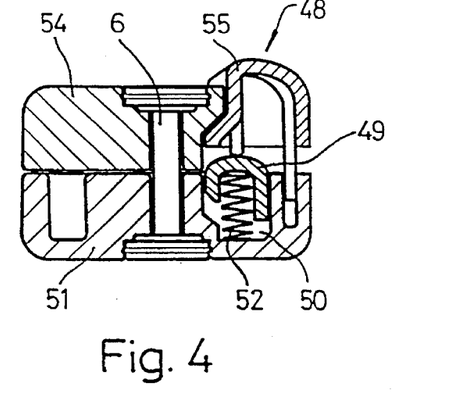

The hinge of the central shaft 6 of the handlebar has a pin 48, which locks it in the extended position, the locating pin consisting of a stopping dog 49 (FIG. 4) seated in the recess 50 of the disc-shaped extension 51 at the end of the L-section 2 of the handlebar, and which protrudes from Said recess by the force of a spring 52 and is inserted into a notch 53 at the outer edge of the other disc-shaped extension 54 at the end of the other L-section 3 of the handlebar, on whose stopping dog there is an external push button 55 which locates the mentioned notch and when pressed seats the stopping dog 49 inside the seat 50, allowing free rotation between the two superposed expansions 51 and 54 around the shaft 6 which passes through their centre.

In addition to this locating pin the frame also has a locating pin 56 on each side to ensure locking of the extended in use position, whose pin, for example, is of the same specifications as those for the frame of the previously mentioned ES-P9002663 patent.

This frame may be complemented with a tray which is coupled to the lower part with suitable devices.

Figure 9:
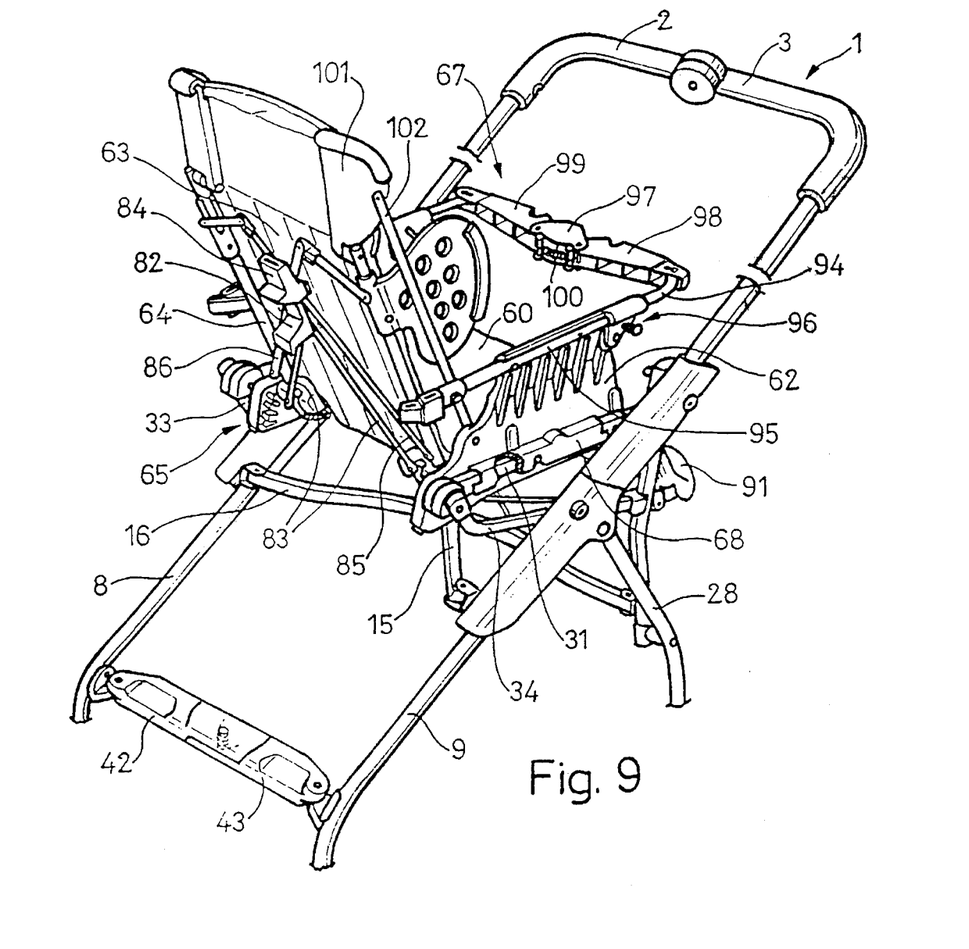
FIG. 9 shows a perspective of the cradle seat coupled to the frame of the baby carriage.
Figure 10:
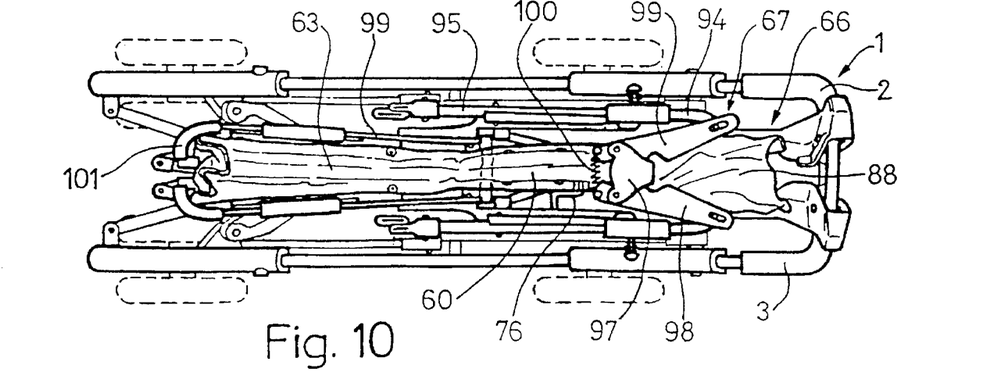
FIG. 10 shows a top view of this assembly, cradle seat and frame, in the folded position.

As shown in FIGS. 9 and 10 the cradle seat is coupled to the foldable baby carriage for which this cradle seat has been mainly designed, and is made up of flexible seat frame 60, consisting of two lateral longitudinal support elements 61 and is provided with lateral arm rests 62. To the lower part of this frame is hinged the flexible back rest frame 63 consisting of two lateral longitudinal support elements 64 on whose lateral part of the frame there are devices 65 for locking the back rest at different angles.

To the front part of the seat frame is hinged a footrest 66, and on the lateral arm rests 62 is hinged a sliding type front railing 67, whose lower lateral sections on the exterior face are provided with chanelled extensions 68 which are fitted to their respective lateral stringers 31 of the baby carriage frame.

The two longitudinal supports 61 of the seat frame are joined together at the lower end by two cross-hinged arms 69 and 70 (FIG. 13) of which one section is hinged through an intermediate point 71. The other sections of said two arms are joined together by a locking caliper 72 which locks the cradle seat in the open, useful position. At the point where the caliper is hinged to the arm 69, a spring 73 is mounted which ensures the open position of the locking caliper to maintain the locked position.

Figure 13:
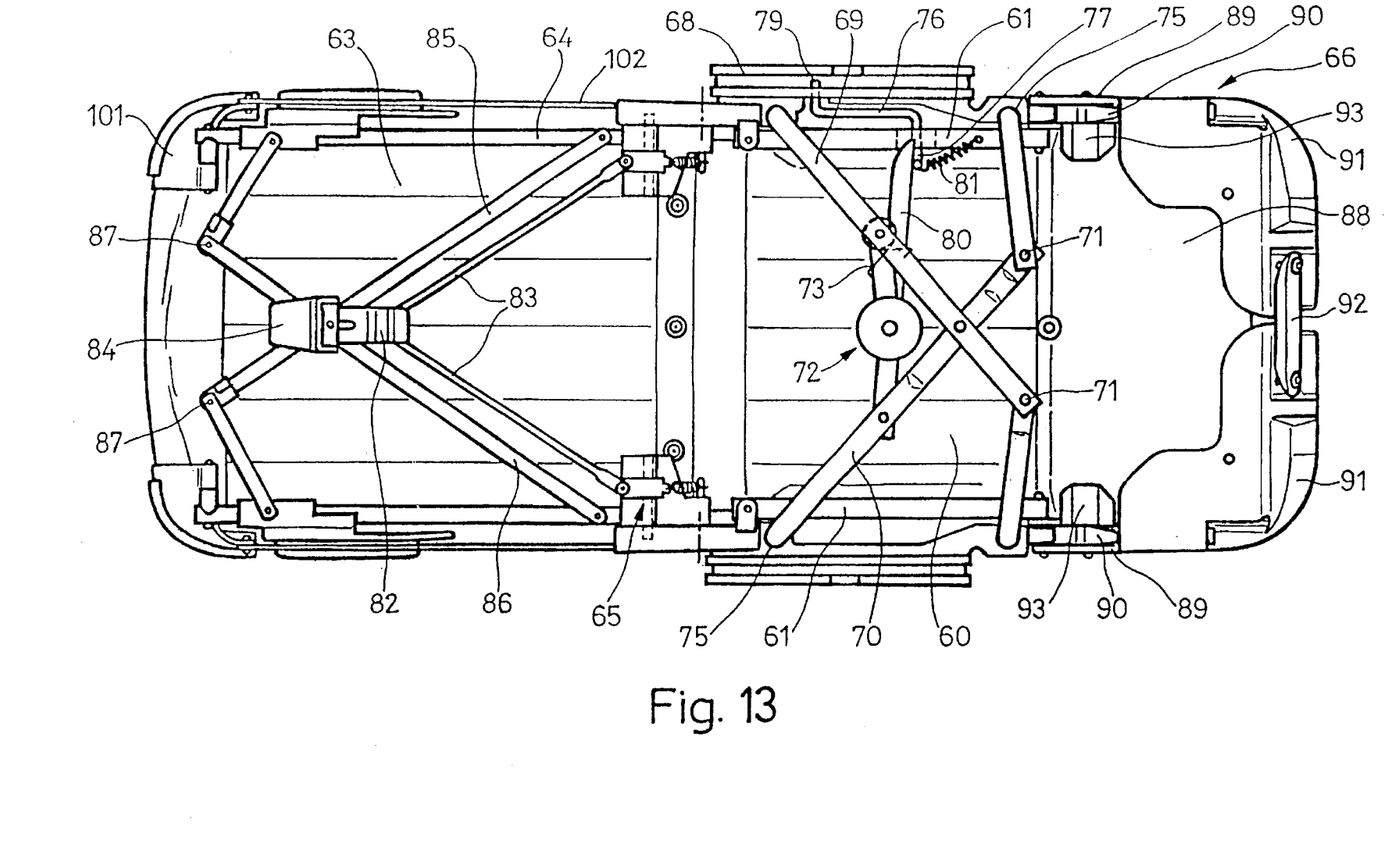
FIG. 13 shows a bottom plan view of the cradle seat.

At their free ends is a aid cross-hinged arms 69 and 70 are bent upward to form vertical sections 74 which are coupled together and may be rotated coaxially in their seats 75 set in the lateral arm rests 62.

Figure 12:
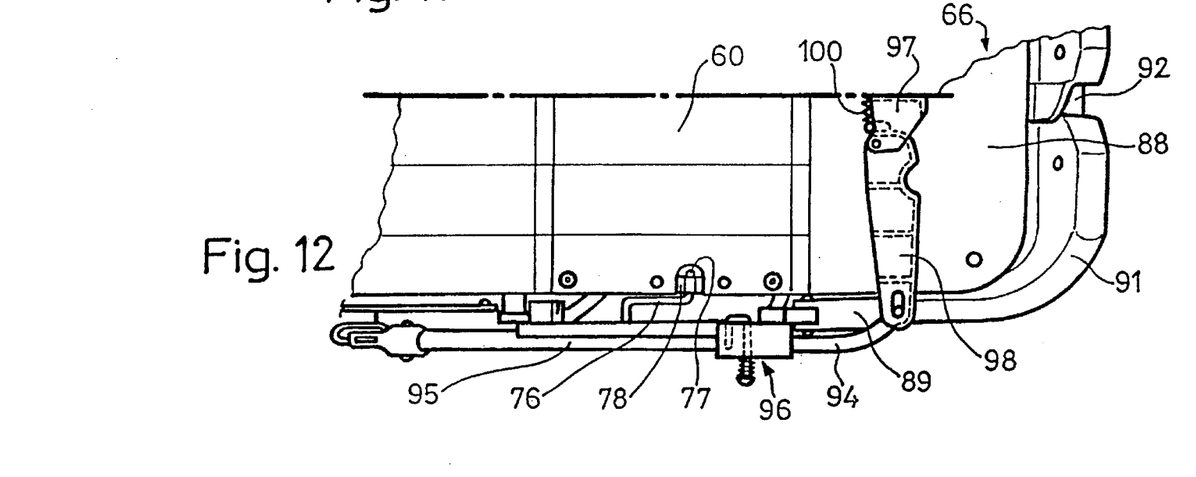
FIG. 12 shows a top plan view of a cradle seat section.

Means have been envisaged on the cradle seat which, when coupled to the frame of the baby carriage, release the locking caliper 72 to allow crosswise folding of the cradle seat together with the folding of the frame, as shown in FIG. 10. The indicated devices are made up of a bent rod 76, which at one end 77, directed downward, is hinged by means of a bracket 78 (FIG. 12) to one of the longitudinal supports 61 of the seat frame, while at the other end 79 (FIG. 13) the rod protrudes from the channeled extension 68 of the corresponding lateral arm rest 62.

On coupling the cradle seat onto the frame of the baby carriage, the end 79 of the rod 76 makes contact with the corresponding lateral stringer 31 of the frame, by which said rod is rotated through the hinge on the bracket 78, whose rotation acts upon the other end 77 of the rod, which pushes the extended arm 80 of the locking caliper, overcoming the resistance of the spring 73 and releasing said caliper, by which the cradle seat can be folded crosswise together with the frame.

When the cradle seat is removed with respect to the frame, the locking caliper 72 is locked again and the bent rod 76 is maintained in its inactive position, as its ends 77 is subjected to the traction of a spring 81 fixed to the corresponding longitudinal support element 61.

Figure 11:
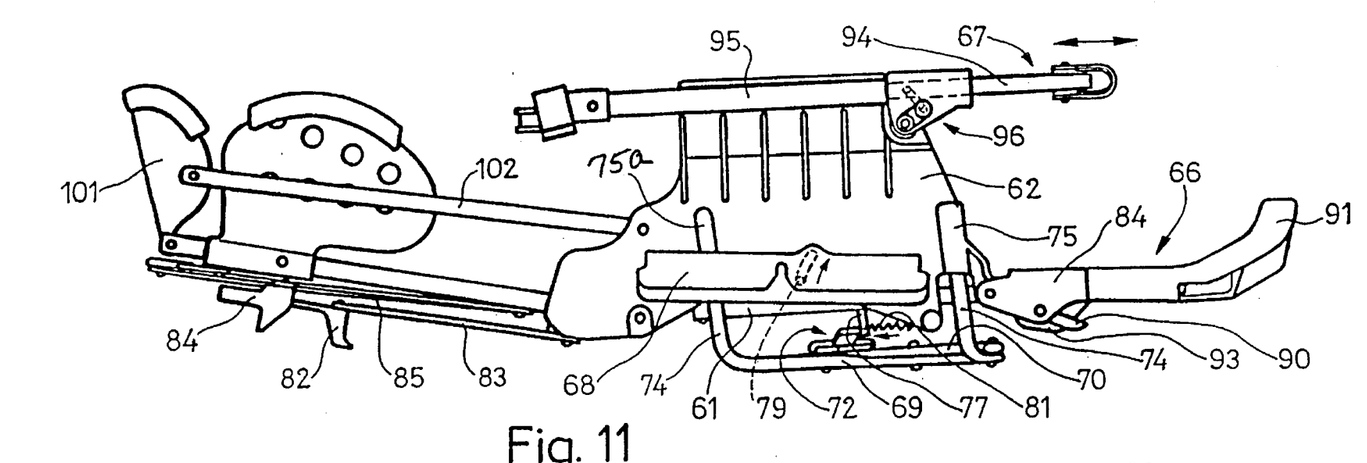
FIG. 11 shows a side elevation of the cradle seat.

The inclined position locking devices 65 of the back rest are released by means of a common central control 82, which is hinged with two diverging tie rods 83 to said devices, whose control is coupled slidewise on a support 84 coupled on the hinge point of two cross-hinged arms 85 and 86 which are joined together at the two longitudinal supports 64 of the back rest frame, of which one of its sections is hinged in turn through an intermediate point 87.

The leg rest is made up of a flexible sheet 88, and consists of a frame with two lateral support elements 89 provided with locking devices 90 for the different inclined positions of the leg rest, and to which are coupled, with optional coaxial rotation capacity, the angular elements 91 located at the side and the front half of the leg rest, and which are joined together hingewise through its front section by a tie rod 92.

The lateral support elements 89 of the frame of the leg rest are at the lower end made up of their respective blocks 93 with lower inclined face, through which the leg rest is pushed upward by the cross-hinged arms 69 and 70 of the seat during transversal folding of the cradle seat if the leg rest is in the lowered position.

The front railing 67 is made up of two lateral arms 94 which are inserted telescopically into the upper tubular sections 95 of the lateral arm supports 62, and which are retained in different protruding positions by means of a locking device 96 so as to adapt its length should the seat be used as such or as a cradle. The front section of the railing consists of three sections, one central-section 97 and the other two 98 and 99 which are longer lateral sections, hinged together, and are held in alignment by means of stopping dogs and the pressure of a spring 100, which is extended when the front railing is folded toward the interior of the seat when the cradle seat is folded (FIG. 10).

The back rest of the cradle seat is provided with a hinged head 101, which is coupled laterally with tie rods 102 to the lateral arm rests 62 to achieve rotation and lock the end of the back rest in its folded position (FIG. 11)

The cradle seat is finished with its corresponding seating pad, and can be generally fitted to foldable frames that are folded in a way similar to the one described.

Figure 14:
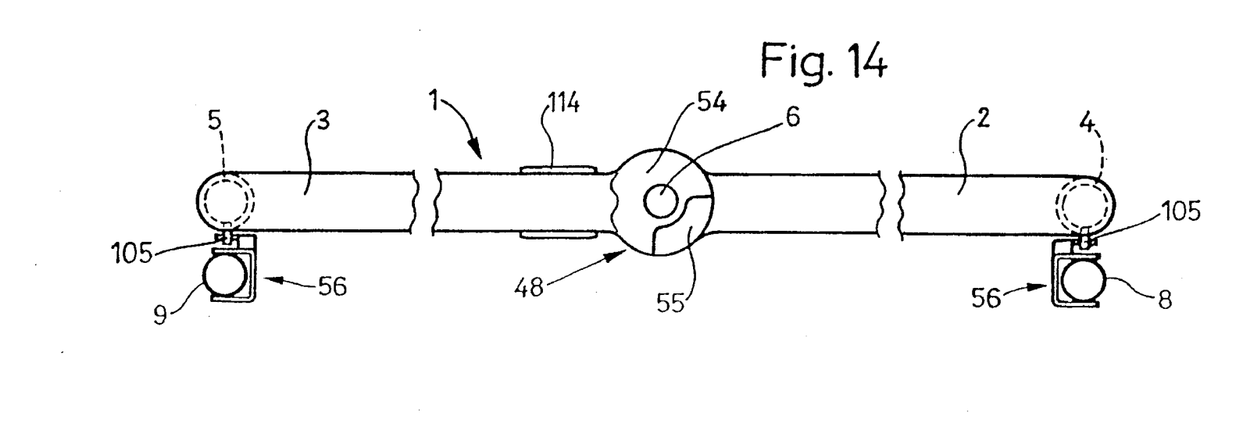
FIG. 14 shows an elevation of the middle section of the handlebar in the extended position of the baby carriage.

As shown in FIG. 14, the handlebar is made up of two "L" sections, 2 and 3, which are hinged together through their lower arms by a transversal shaft 6, and make up the middle section of the handlebar which forms the pushing handle of same, while the upper arms of the "L" sections make up the branches 4 and 5 of the handlebar.

Figure 16:
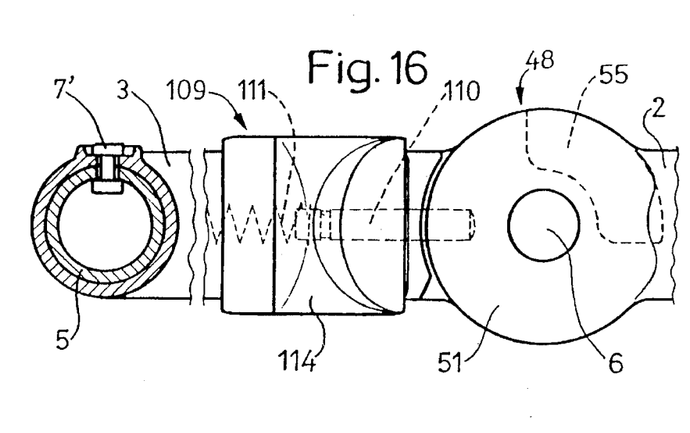
FIG. 16 shows a rear elevation of the above mentioned safety device.

The lower arms of the 2 and 3 "L" sections are made up of plastic tubular parts in whose elbow ends the upper ends of the upper steel arms 4 and 5 are inserted, to stiffen these two "L" sections, and are secured with a rivet 7, (FIG. 16)

The handlebar, by means of its branch sections is slide-mounted on the front feet 8 and 9, and its branches 4 and 5 have divided lower zones to make up the end sections 4 (FIG. 17) joined to the guide-flanges 24 along which the front feet slide.

Figure 17:
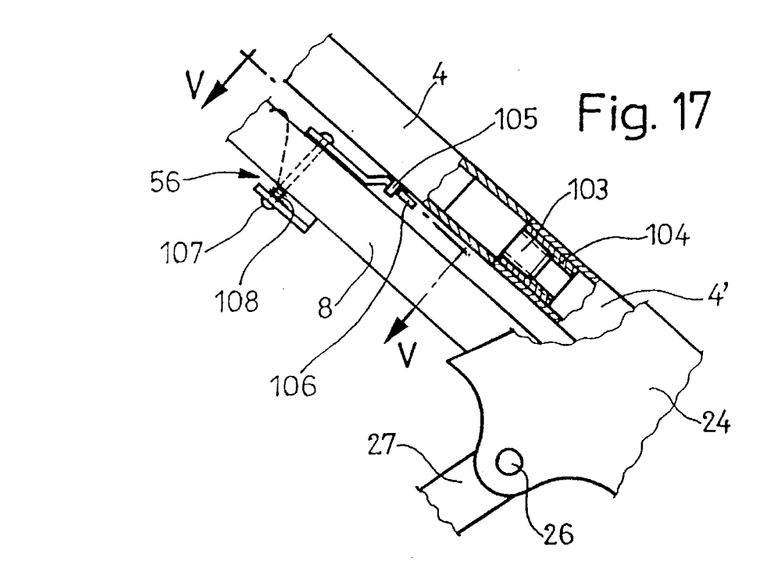
FIG. 17 shows a side elevation of the construction details, with coaxial rotation, of the handlebar branch sections, with the locking pin envisaged on the front feet.
Figure 18:
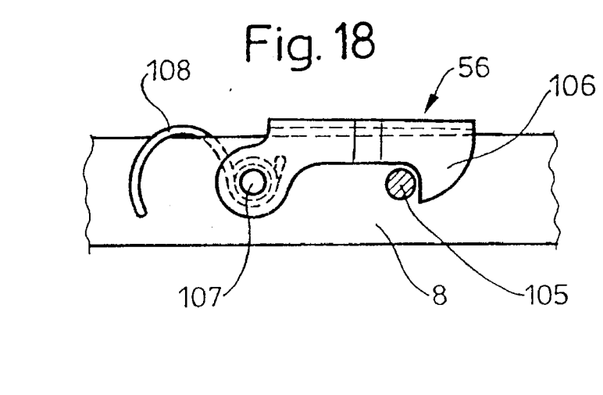
FIG. 18 is a detail plan view of the locking pin mounted on the front feet.
Figure 19:
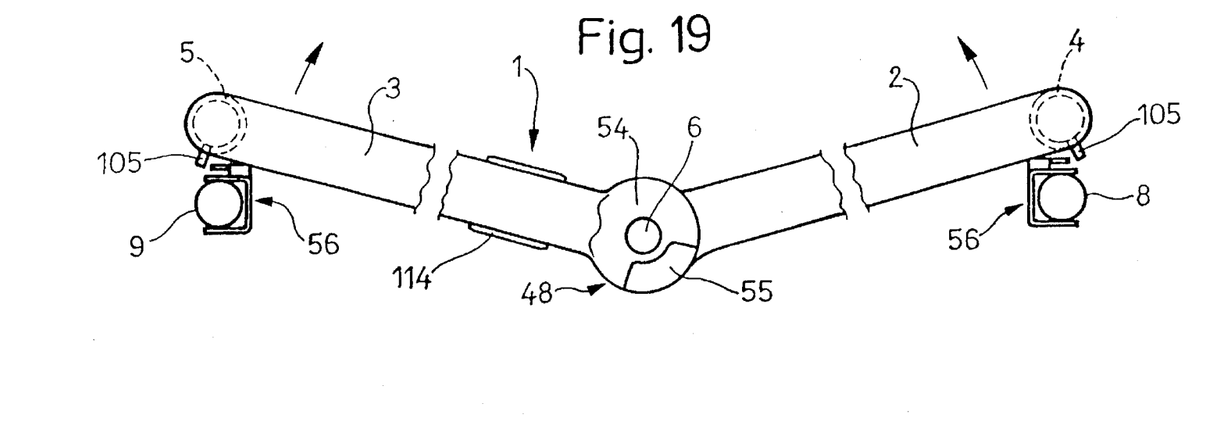
FIG. 19 is an elevation of the initiation of folding of the handlebar with unlocking of the locking pins mounted on the front feet.

The branches 4 and 5 of the handlebar can rotate coaxially with respect to the end sections 4 of same. To this purpose, coupling between each other can be performed, for example, by a threaded rod 103, joined to the branches 4 and 5, which is threaded into a threaded socket 104 joined to said sections 4.

Said handlebar sections 4 and 5 have a projection 105 (FIG. 17) on their lower face on which the locking pin 56 is hooked when the baby carriage is in the extended position, whose locking pin is mounted on the front feet 8 and 9. This locking pin is made up of a hook 106 made of a single "U"

section and hinged by means of the pin 107 to the upper part of the front feet, whose hook holds the projection 105 against which it is pushed by a helical spring 108 threaded on the pin 107, and whose ends rest, respectively, on the front foot and the "U" section which makes up the hook 106.

The extended position of the handlebar (FIG. 14) is locked, besides locking pin 48 action, by means of a safety device made up of a latch 110 (FIG. 15) pressed on one end by a spring 111, and which on the other end is inserted in a bolt eye 112 envisaged in the discoidal expansion 51, preventing its rotation with respect to discoidal expansion 54 of part 3 of the handlebar where said latch 110 is mounted in a recess 113 of said part.

Figure 15:
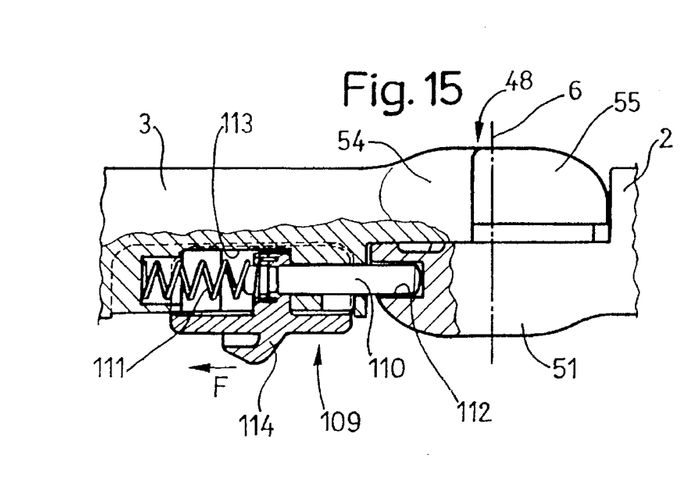
FIG. 15 shows in detail a sectional elevation of the construction of the handlebar safety device.

This latch is joined to an exterior control 114 of half-round section which slides on the rear part of the short end of part 3 of the handlebar.

On turning the safety device in the direction of the arrow F (FIG. 15) it is released to the expansion 51 with respect to the latch 110, and on pressing the button 55 as well, the safety pin 48 is unlocked, and it is now possible to turn the shorter arms of the "L" shaped sections, 2 and 3, which form the pushing handle of the handlebar with reference to each other, and by whose angular rotation (FIG. 6) determines the coaxial rotation of the branches, 4 and 5, of the handlebar joined to said shorter arms, and thereby release the projections 105 of said branches with respect to the locking pins 56 mounted on the front feet, thereby allowing complete folding of the baby carriage.

The safety device which locks the hinge of the handlebar can also be mounted on the locking pin itself 48 to lock it against involuntary pressing of its pushbutton.

I claim:

1. A carriage comprising a foldable frame including a cradle seat having a seat frame, said seat frame including a pair of lateral arm rests supporting a front railing, a back rest pivotably connected to said arm rests, first locking means for allowing a plurality of inclined positions for said back rest, said cradle seat including a foot rest connected to said seat frame, said seat frame comprising two laterally spaced apart support arms, a pair of pivotably connected arms each having an end connected to a said support arm, each pivotably connected arm having an end portion pivotably connected to the other said respective support arm and another portion joined together by said connected arms by second locking means which locks said seat frame in an extended position, said second locking means including an elastic member, said end portions of said pivotably connected arms form a bend extending upwardly through and are rotatably coupled to said respective lateral arm rests.

2. The carriage as claimed in claim 1 wherein said cradle seat is coupled to said seat frame by means of a coupling member whereby said cradle seat is foldable with said foldable frame upon unlocking said second locking means.

3. The carriage as claimed in claim 2 wherein said first locking means are movable from a locked to an unlocked condition by a central control member which is linked by tie rods to said first locking means.

4. The carriage as claimed in claim 3 wherein said backrest has opposite lateral longitudinal supports, said central control is slidably mounted on a support which is positioned at a pivot point of two crossed arms which are connected to said longitudinal supports of said backrest.

5. The carriage as claimed in claim 1 wherein said second locking means comprises a rod which has one end pivotably mounted on said support arm and an opposite end which extends through an associated arm rest, said locking means including an extended member, rotation of said rod being effective to engage and move said extended member of said second locking means to move said second locking means from a locked to an unlocked condition.

6. The carriage as claimed in claim 5 wherein said rod is joined by an elastic member which urges said rod to a deactivated position, out of contact with said extended portion of said second locking means.

7. A carriage comprising a foldable frame including a cradle seat having a seat frame, said seat frame including a pair of lateral arm rests supporting a front railing, a backrest pivotably connected to said arm rest, first locking means for allowing a plurality of inclined positions for said backrest, said cradle seat including a footrest connected to said seat frame, said seat frame comprising two laterally spaced apart support arms, a pair of pivotably connected arms each having an end connected to a said support arm, said pivotably connected arms having an end portion pivotably interconnected together and another portion joined together by second locking means which lock said seat frame in an extended position, said second locking means including an elastic member, said footrest being flexible and having a framework comprising two lateral supports provided with a locking member to allow for different inclined positions of said footrest, said footrest having spaced angular members which are hinged together to allow folding when said frame is folded.

8. The carriage as claimed in claim 7 wherein said lateral supports include protruding portions facing downwardly in use so that when said frame is folded, said protruding portions will be engaged by portions of said frame to push said footrest upwardly when said cradle seat is folded transversely.

9. A carriage comprising a foldable frame including a cradle seat having a seat frame, said seat frame including a pair of lateral arm rests supporting a front railing, a backrest pivotably connected to said arm rest, first locking means for allowing a plurality of inclined positions for said backrest, said cradle seat including a footrest connected to said seat frame, said seat frame comprising two laterally spaced apart support arms, a pair of pivotably connected arms each having an end connected to a said support arm, said pivotably connected arms having end portions pivotably interconnected and another portion joined together by second locking means which lock said seat frame in an extended position, said second locking means including an elastic member, said front railing comprising two portions joined together about a pivot so that said front railing is foldable toward the interior of said cradle seat, said front railing having elastic members urging said front railing to an extended position.

* * * * *